Oct. 9, 1962  J. K. GAUNT ET AL  3,057,141
MACHINES FOR HARVESTING CROPS
Filed Dec. 28, 1959  5 Sheets-Sheet 1

Inventors
JAMES KENNETH GAUNT &
PERCIVAL CHARLES STEPHENS
By
Attorney

Inventors
JAMES KENNETH GAUNT &
PERCIVAL CHARLES STEPHENS
By
Attorney

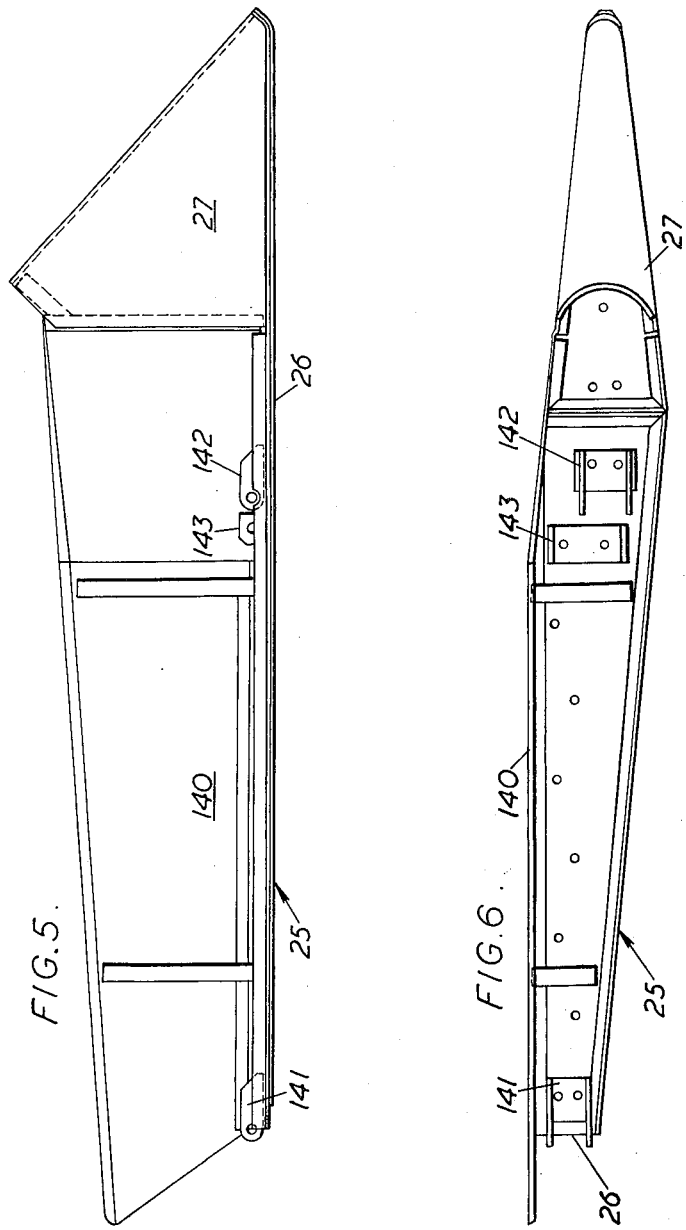

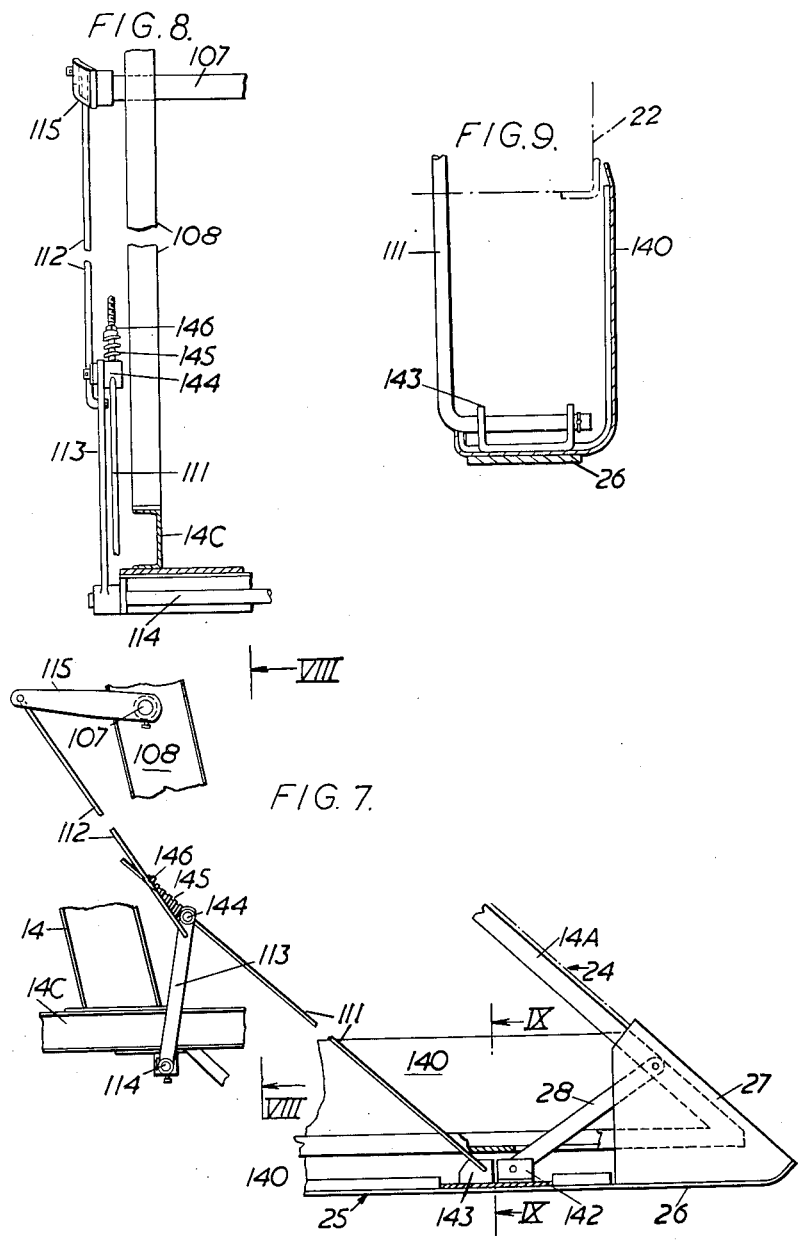

United States Patent Office 3,057,141
Patented Oct. 9, 1962

3,057,141
MACHINES FOR HARVESTING CROPS
James Kenneth Gaunt, Strathmore, Victoria, and Percival Charles Stephens, Beaumaris, Victoria, Australia, assignors to Massey-Ferguson (Australia) Limited, Sunshine, Victoria, Australia
Filed Dec. 28, 1959, Ser. No. 862,279
3 Claims. (Cl. 56—119)

This invention relates to machines for harvesting crops, especially machines for harvesting tall crops such as sugar cane and maize which are grown in widely spaced rows and also harvester-threshers, usually called combine harvesters.

The invention relates in particular to harvesting machines as aforesaid of the type in which the effective cutting width of the means for severing the standing crops is limited on one side at least, namely the crops side of the machine, by a vertical side wall presenting a front which is inclined rearwardly upwards from a low level to engage and lift the stems of plants which recline at an outward inclination.

Usually, although not necessarily, a harvesting machine of the type stated would have two such vertical side walls limiting the effective cutting width at both sides of the machine.

An object of the invention is to provide means for facilitating and rendering more effective the crop engaging and lifting function of the side wall or walls.

The invention is a harvesting machine with a vertical side wall which limits the effective crop cutting width and presents a front which is inclined upwardly rearwards from a low level, the machine having a ground-engaging shoe which is arranged at the low forward end of the side wall and is supported by means permitting the shoe, in the progress of the machine, to rise and fall relatively to the side wall in accordance with undulations on the ground.

Preferably, the shoe has a sole provided at its front end with a nose which fits over the end of the side wall and which presents a leading face that is inclined upwardly rearwards.

The invention will now be described by way of example with reference to the accompanying drawings as embodied in a sugar cane harvesting machine. In the drawings:

FIG 1. is a front view showing the harvesting machine attached to a tractor, and FIG. 2 is a corresponding perspective view from the front and right hand side.

FIG. 5 is a side view of a shoe and FIG. 6 is a corresponding plan.

FIG. 7 is a side view with parts broken away, of a link-and-lever mechanism for lifting the shoe clear of the ground, and FIG. 8 is a sectional view approximately on the line VIII—VIII in FIG. 7, being drawn to a larger scale.

FIG. 9 is a detail view of the right hand shoe, being a section on the line IX—IX of FIG. 7.

Figure 1:
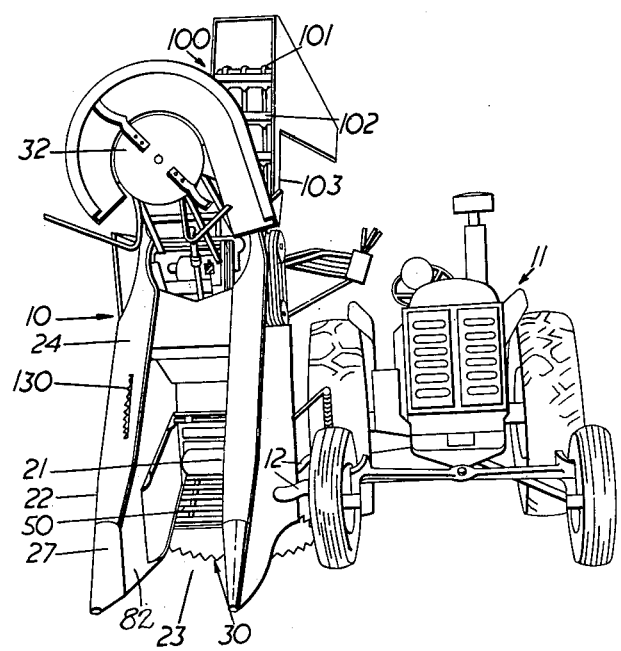

The sugar cane harvesting machine shown is a wheeled vehicle 10 which is attachable to a tractor 11 side-by-side. The machine includes a wheeled base frame 13, which pivotally supports a main frame 14 carrying the cutting and conveying mechanism of the harvester and an engine 15 for driving such mechanism. The engine also drives a pump 19 which is connected in a hydraulic system for lifting, lowering and supporting various parts, to some of which reference is made hereinafter. The pivotal axis of the main frame 14 is arranged transversely at or near the rear end thereof. The frame 14 is supported on the wheeled base frame 13 by a pair of cylinder-and-plunger units 20, one at each side of the machine, which are connected in the hydraulic system and are operable to tilt the frame into its raise position for transport and to lower it into its working position.

The spaced vertical side walls of the harvester are indicated by 21 and 22. The walls define an open-fronted throat 23, seen best in FIG. 1, to receive a row of standing sugar cane in the progress of the harvester. The leading edges 24, FIGS. 2 and 4, of the side walls incline rearwardly upwards. The side walls are associated with shoes 25, hereinafter more fully described, which have ground-engaging soles 26 and noses 27 which enclose the lower ends of the side walls 21, 22. These shoes are suspended from members 14A, 14B of the main frame 14 by parallel linkages 28. The noses 27 and side walls 21, 22 serve to pick up and raise outwardly inclined and fallen stems or sticks of sugar cane.

The means for severing the butts of the sticks is a single circular rotary cutter 30.

Moreover, the machine is provided with means for cutting the tops from the standing cane. This cutting means is indicated by 32 in FIGS. 1, 2 and 4.

Figure 3:
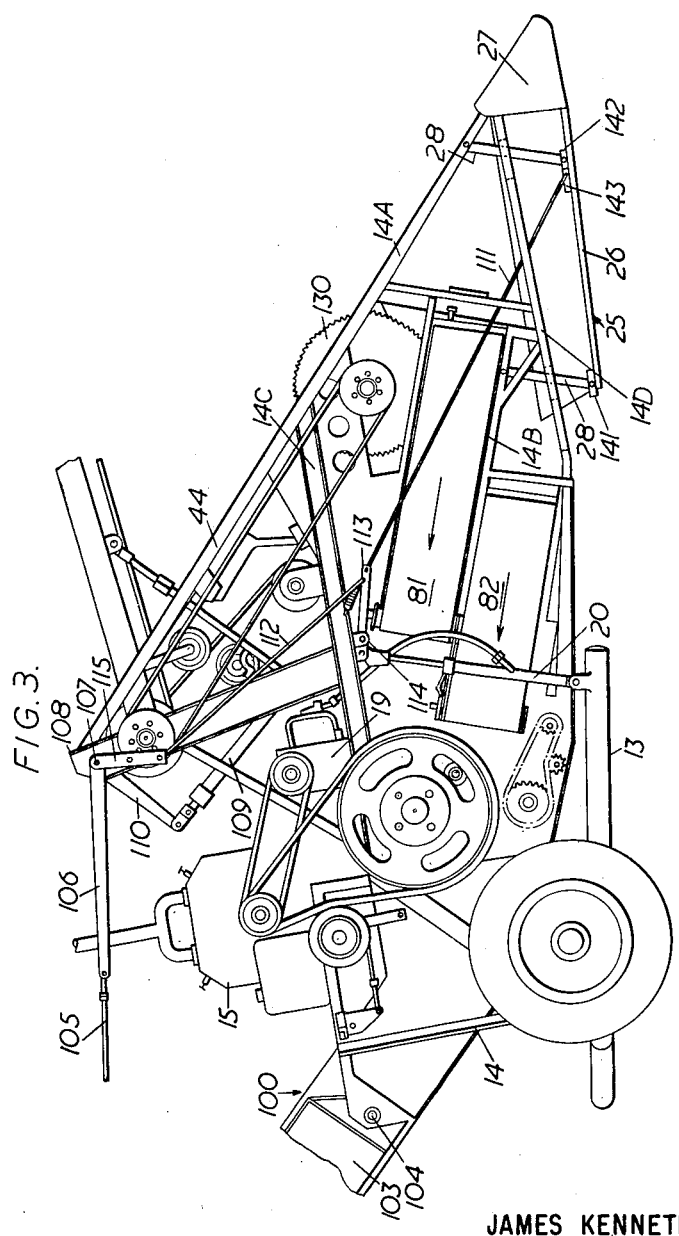
FIG. 3 is a side elevation of a harvesting machine similar to that shown in FIG. 1 with various outer parts removed and a modified form of side conveyor embodied therein.

Each of the walls 21, 22 is of hollow construction, comprising a suitable frame structure, including the member 14A, lined on its inner, upper and outer sides with sheet metal. In FIG. 3, the sheet-metal lining is removed.

The rotary cutter 30 is located at a low level with its axis offset from the central longitudinal plane of the throat so as to be much nearer to the left hand wall 21 than the opposite wall 22. Moreover, that portion of the cutter which at any instant is actively severing the sticks extends across the full width of the throat 23 and works from the near wall 21 to the opposite wall 22.

The means for conveying the severed crop rearwardly comprises an endless conveyor 50, hereinafter referred to as the bottom conveyor, which is arranged longitudinally within the throat 23 and serves to convey the severed cane sticks rearwardly from the butt severing means.

Figure 4:
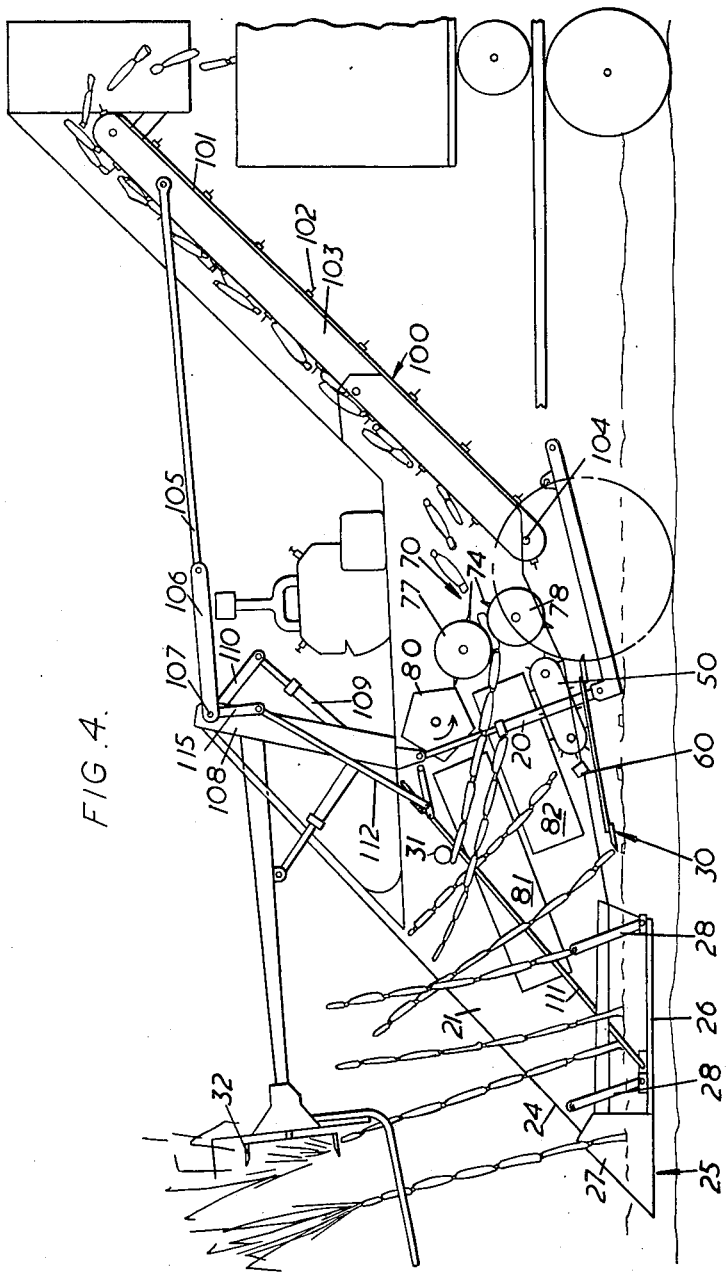
FIG. 4 is a diagrammatic view of the harvesting machine of FIG. 3 as seen from the left hand side.

The machine has means, indicated by 70 in FIG. 4, for chopping the cane sticks into billets. The chopping means comprises a pair of rotary assemblies 77 and 78 which include co-operating cutting blades 74 phased edge-to-edge which are effective to grip each cane stick, carry it rearwardly from the conveyor 50, chop it into short lengths or billets, and throw them rearwardly for collection.

In order further to assist in feeding the cane sticks to the billet chopper 70 a rotary feed roller 80 is arranged above and in front of the upper rotary assembly of the chopper.

Each of the vertical side walls 21, 22 defining the throat 23 is provided with one or more longitudinally extending endless belt conveyors, having their inner working stretches arranged in vertical longitudinal planes and being so located that each such stretch is substantially flush with the inner surface of the associated wall so that in effect the conveyor forms a rearwardly moving portion of the wall.

In the example according to FIGS. 3 and 4, each side wall 21, 22 has two such belt conveyors, namely an upper conveyor 81 and a lower conveyor 82 which extends rearwards beyond the upper conveyor to a position in close proximity to the billet chopper 70.

The cane sticks are thus conveyed from the butt cutter 30 to the billet chopper 70 by the bottom conveyor 50, the two side conveyors 81, 82 in each wall and by the feed roller 80 which engages the upper surface of the sticks.

If desired, only a single wall conveyor, say the conveyor 82, may be provided in each wall, as in the example according to FIG. 1.

The harvester also includes an elevator 100 for conveying the chopped billets rearwardly upwards. In the example, this elevator consists of endless sprocket-driven chains 101 and channel-section slats 102. The working stretch of this elevator works rearwardly upwards along a passageway provided by a long frame 103, the lower end of which is pivotally connected at 104 to the main frame 14. The elevator is arranged to extend at a steep inclination from the proximity of the billet chopper 70, the arrangement being such that the billets thrown rearwards at an upward inclination by the pairs of cooperating blades 74 are received directly upon the elevator at a level well above its lower end, as FIG. 4 illustrates, so that they are carried upwardly by the slats 102.

The elevator 100 is adapted to be moved angularly about its pivotal connection 104 in order that it may be arranged in an upright position for convenience in transport. For this purpose, the opposite sides of an upper part of the elevator frame 103 are connected by forwardly extending pivoted links 105 to the rear ends of arms 106 secured to a transverse rock shaft 107 journalled on upper parts 108 of the main frame 14 of the machine. The rock shaft is turnable by means of a hydraulic cylinder-and-plunger unit 109 connected in the hydraulic system. The unit 109 acts on an arm 110 secured to the rock shaft.

The shoes 25 are liftable by a link-and-lever mechanism. This mechanism, for each shoe, comprises links 111, 112 and an intermediate lever 113, which is fulcrumed at 114 on a member 14C of the main frame 14. Opposite ends of the links 113, 114 are pivotally connected to the associated shoe and one of two side arms 115 on the rock shaft 107. The arrangement is such that when the unit 109 is extended to raise the elevator 100 into its transport position, the shoes 25 are simultaneously swung on their suspensory linkages 28 clear of the ground.

The front edge 24 of the right hand wall 22, is at the "crops" side of the machine (namely, the side adjacent the still standing sugar cane in the field and opposite the tractor 11) has additional means for cutting off any sugar cane tops which may bend outwards over said wall out of reach of the cutting means 32. The additional means provided consists of a rotary horizontal-axis disc cutter 130 with a serrated cutting edge.

With further reference to the ground-engaging shoes 25, each of them comprises the elongated sole plate 26 which is formed to slide over the ground below a lower frame member 14D at and near the forward end of the respective side wall 21 or 22, and the hollow nose 27 is secured to and projects upwardly from the forward end of the sole plate to enclose the lower part of the forward end of the said wall. There is a frame member 14D at each side of the main frame 14 and these members 14D project forwards to form the lower limits of the two side walls 21 and 22. A plate 140 forming a vertical longitudinal wall member extends upwardly from the inner edge of each sole plate 26 close to but inwardly of the inner surface of the respective side wall 21 or 22 of the machine, the said wall plate 140 of the shoe being of such a height that it always covers the lower member 14D of the side wall, see FIG. 9, to prevent or minimise the entry of material between the sole plate and the bottom of the side wall.

The depending links 28 by which each shoe is suspended from the frame members 14A, 14B of the respective hollow side wall 21 or 22 of the machine are respectively connected by pivot pins to a bracket 141 on the rear end of the sole plate and another bracket 142 arranged as far forwardly thereof as is practicable. The links 28 are approximately equal in length, and are approximately parallel and are for convenience herein termed parallel links, though this expression is to be understood as comprehending the aforesaid approximations. These links are so arranged that they incline forward upwards at a small angle when the shoe is lowered to its full extent. These links have their upper ends pivotally connected by pivot pins to the supporting frame members 14A, 14B within the sheet-metal cladding on the associated hollow side wall, and they extend downwardly through long slots in the bottom of the frame member 14D.

If either shoe 25 when fully lowered is pushed rearwardly, it simultaneously swings upwardly in an arc, and by suitably selecting the length and initial inclinations of the links this arc approximates to the inclination of the leading edge 24 of the side wall.

With reference to the link-and-lever mechanism 111—115, this mechanism at each side of the machine is arranged within the hollow wall at that side. Each link 111 has its lower end pivotally connected to a bracket 143 on the respective sole plate 26 at a suitable position between the ends of the shoe. This link inclines upwardly and rearwardly at an angle such that it is approximately parallel to the leading edge 14A of the wall, and its upper end extends slidably through a swivel block 144 on the free end of the lever 113, the fulcrum 114 of which is a transverse spindle common to the levers 113 at both sides. A buffer spring 145 surrounds the upper end of the link above the swivel block 144 and abuts at its upper end against a nut 146 on the link.

As already described, the hydraulic unit 109 is operable to lift the elevator 100 to its upright position for transport. By virtue of the mechanism 111—115, the action of lifting the elevator simultaneously lifts the shoes 25 in unison clear of the ground. In this position the shoes are supported by the buffer springs 145. Conversely, when the unit 109 is operated to lower the elevator 100 to its working position, the shoes 25 are permitted to fall in unison under their weight until they both rest upon the ground, at this level relieving the pressure on the buffer springs 145. Thereafter, in progress of the machine, as the shoes ride over undulations on the ground they freely rise and fall independently of each other and of the frame 14. In effect, they "float" upon the ground. This freedom to float is derived from the nature of the connection, including the swivel block 146, between each link 111 and the associated lever 113. This connection is of the "lost-motion" type; that is to say, the link can slide freely upwards and can also slide downwards until restrained whenever the spring 145 is adequately compressed. Thus, relatively to the frame 14, each shoe is free to rise as far as permitted by the frame member 14D and is free to fall as far as permitted by the spring 145; and these limits may be adjusted by appropriate adjustments of the nuts 146 and the holding position of the hydraulic units 20.

Figure 2:
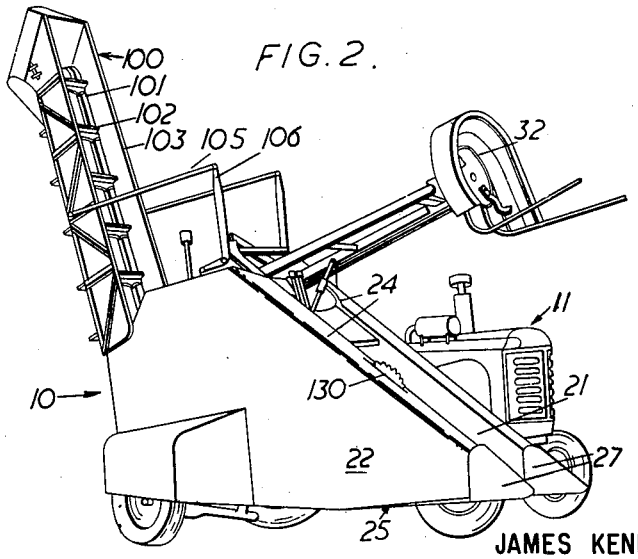

In FIG. 2 the elevator 100 and the main frame of the machine, as represented in this view by the side walls 21 and 22, are fully raised into their transport positions, and the shoes 25 also are fully raised. Thus it will be seen that there is ample clearance of the main frame and shoes from the ground.

In FIG. 3 the hydraulic unit 109 is shown contracted to lower the elevator and the shoes 25, although the hydraulic units 20 are still extended to hold the main frame 14 in its transport position.

In the diagrammatic view, FIG. 4, both the main frame 14 and the shoes 26 are fully lowered for work, the shoes accordingly engaging the ground. In this position, the shoes will move underneath fallen cane sticks, even those lying close to the ground, and will raise them so that they pass into the throat 23 for severing, conveyance, chopping and elevation for delivery.

In FIG. 7, a shoe 25 is shown raised relatively to the main frame 14. A comparison between FIGS. 3 and 7 will show that in both lowered and raised positions of each shoe 25 in relation to the frame 14, by virtue of the parallel linkage 28, the shoe maintains practically the same horizontal setting; i.e. its "attitude" to the ground remains unchanged.

We claim as our invention:

1. In a machine for harvesting tall crops, the combination comprising, a frame including a pair of laterally spaced, vertically extending walls defining a throat, said walls being tapered to forwardly extending points on either side of the entrance to said throat, a pair of soles with one sole being positioned beneath each of said walls, each of said soles carrying a forwardly pointed shoe fitted over and shielding the overlying points of said walls, and means for floatingly suspending said soles on said walls so that the soles freely ride over ground undulations as the machine is moved forwardly.

2. In a machine for harvesting tall crops, the combination comprising, a frame including a pair of laterally spaced, vertically extending walls defining a throat, said walls being tapered to forwardly extending points on either side of the entrance to said throat, a pair of soles with one sole being positioned beneath each of said walls, each of said soles carrying a forwardly pointed shoe fitted over and shielding the overlying points of said walls, and a parallelogram linkage suspending said soles on said walls so that the soles are free to float up and back beneath the walls with said shoes moving along the upper sloping surfaces of said walls.

3. In a machine for harvesting tall crops, the combination comprising, a frame including a pair of laterally spaced, vertically extending walls defining a throat, said walls being tapered to forwardly extending points on either side of the entrance to said throat, a pair of soles with one sole being positioned beneath each of said walls, each of said soles carrying a forwardly pointed shoe fitted over and shielding the overlying points of said walls, a rockshaft for elevating components of said machine into transport position, and a linkage coupling said rockshaft and said soles so as to draw the soles upwardly beneath said walls when the rockshaft is rocked, said linkage including a lost-motion, pivoting joint so as not to interfere with the floating suspension of said soles when said rockshaft is not rocked.

References Cited in the file of this patent

UNITED STATES PATENTS

| | | |
|---|---|---|
| 2,466,555 | Paine et al. | Apr. 5, 1949 |
| 2,473,978 | Van Buskirk | June 21, 1949 |
| 2,860,476 | Francis et al. | Nov. 18, 1958 |
| 2,862,345 | Wigham | Dec. 2, 1958 |
| 2,867,068 | Dumanowski | Jan. 6, 1959 |

FOREIGN PATENTS

| | | |
|---|---|---|
| 1,103,843 | France | June 1, 1955 |